Nov. 28, 1933.  R. HELMER  1,936,837
SYNCHRONOUS MOTOR
Filed Jan. 8, 1931    3 Sheets-Sheet 1

WITNESSES
INVENTOR
Robert Helmer
BY
ATTORNEYS

Nov. 28, 1933.  R. HELMER  1,936,837
SYNCHRONOUS MOTOR
Filed Jan. 8, 1931  3 Sheets-Sheet 2
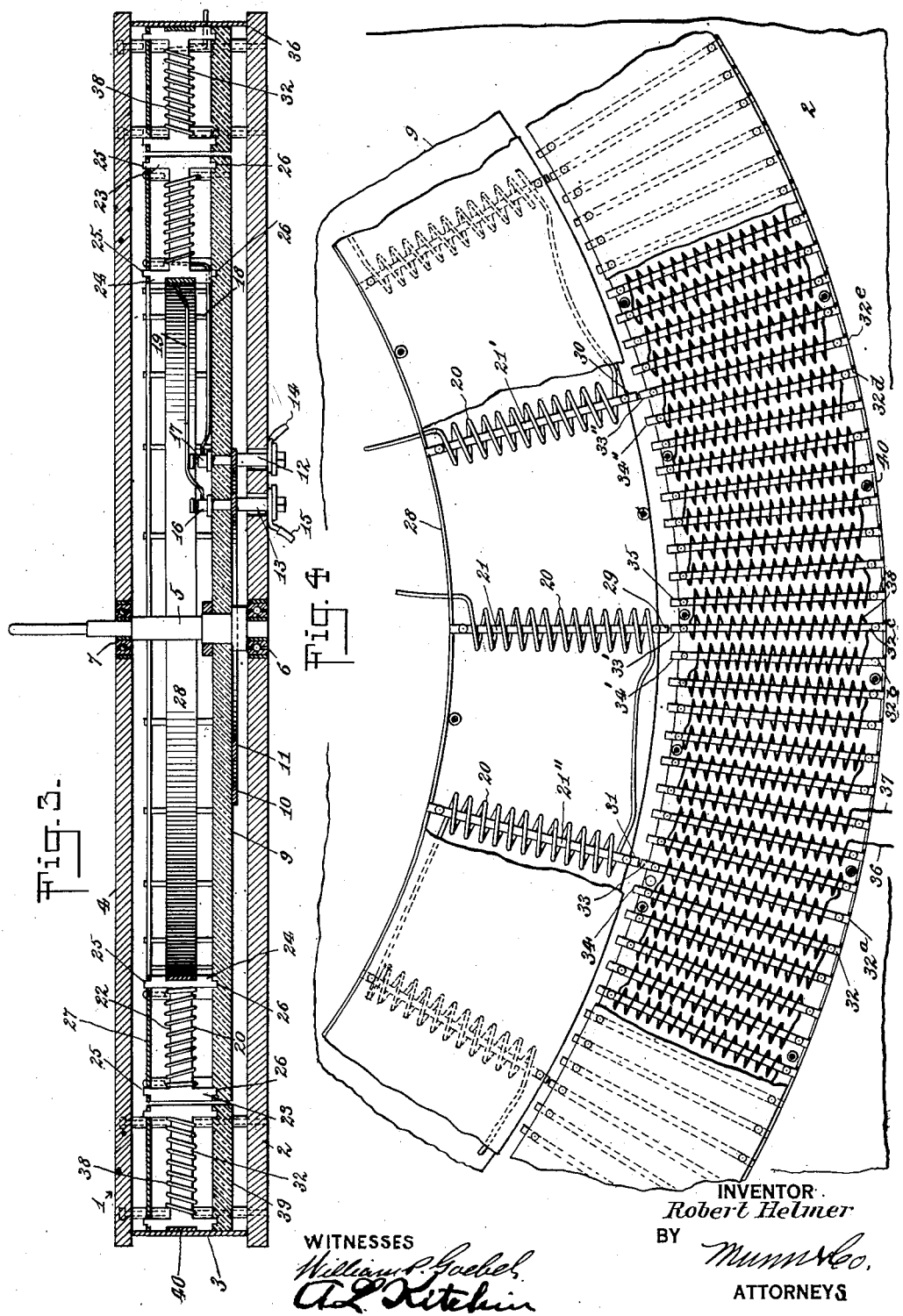
INVENTOR
Robert Helmer
BY
Munn & Co.
ATTORNEYS Nov. 28, 1933.   R. HELMER   1,936,837
SYNCHRONOUS MOTOR
Filed Jan. 8, 1931   3 Sheets-Sheet 3
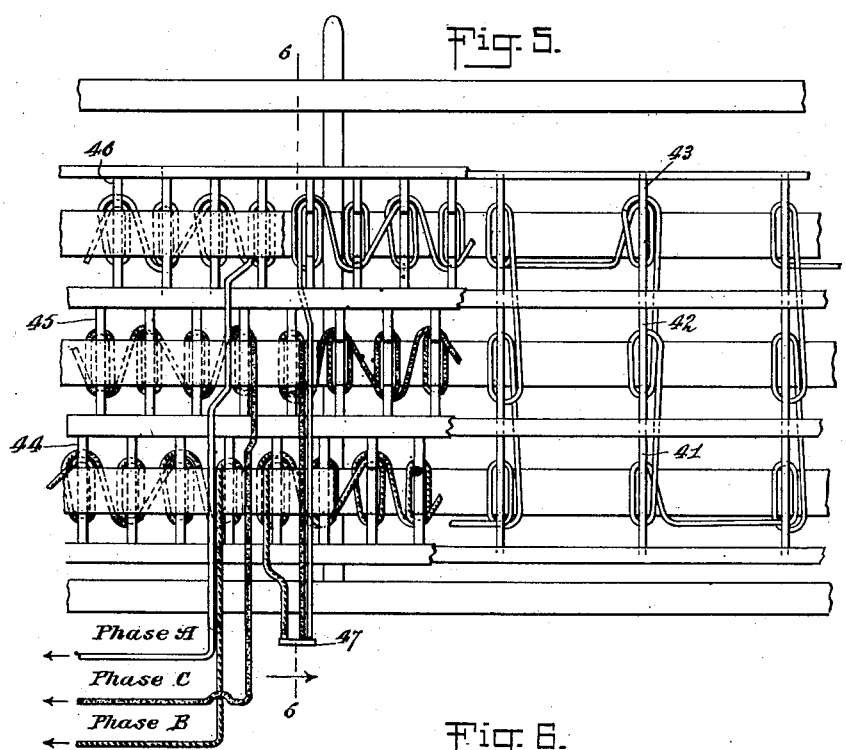
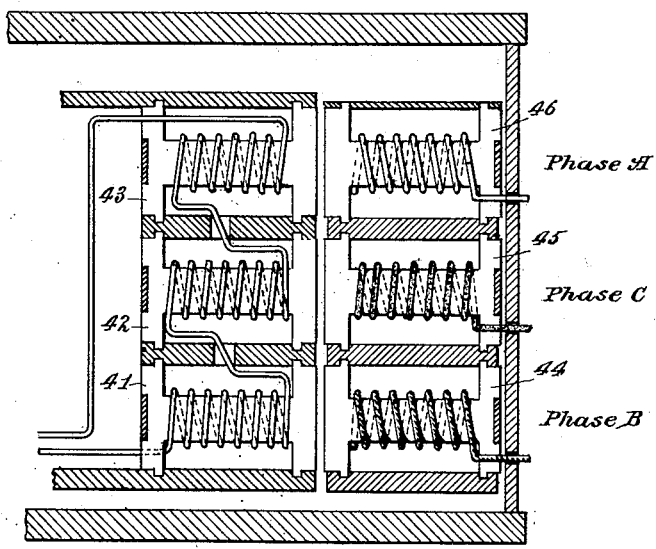
WITNESSES
INVENTOR
Robert Helmer
BY
ATTORNEYS Patented Nov. 28, 1933

1,936,837

UNITED STATES PATENT OFFICE

1,936,837

SYNCHRONOUS MOTOR

Robert Helmer, Flushing, N. Y., assignor to Mamie Helmer, Flushing, N. Y.

Application January 8, 1931. Serial No. 507,456

10 Claims. (Cl. 172—120)

This invention relates to a synchronous motor and has for an object to provide an improved construction wherein either a single or polyphase current may be used to secure exact results whereby the motor is caused to rotate an exact number of revolutions per minute.

Another object of the invention is to provide a synchronous motor wherein the action of the frequency of an alternating current determines the speed of the motor for a given construction.

A further object, more specifically, is to provide a synchronous motor whereby upon the variation in number of the field pole pieces different speeds may be secured, that is, an exact speed for each arrangement of the field pole pieces, the variation of the number of field pole pieces varying the revolutions per minute.

An additional object is to provide a synchronous motor wherein the field and the armature are juxtaposed with the connections such that direct current is used in one part and alternating current in the other.

In the accompanying drawings—

Figure 3 is a sectional view through Figure 1 on the line 3—3;

Figure 4 is an enlarged fragmentary view showing more or less in diagram the position of the pole pieces and the form of the windings of the field and of the armature;

Figure 5 is a view similar to Figure 2 but showing an arrangement where a three-phase current is being used;

Figure 6 is a sectional view through Figure 5 approximately on the line 6—6.

Figure 1:
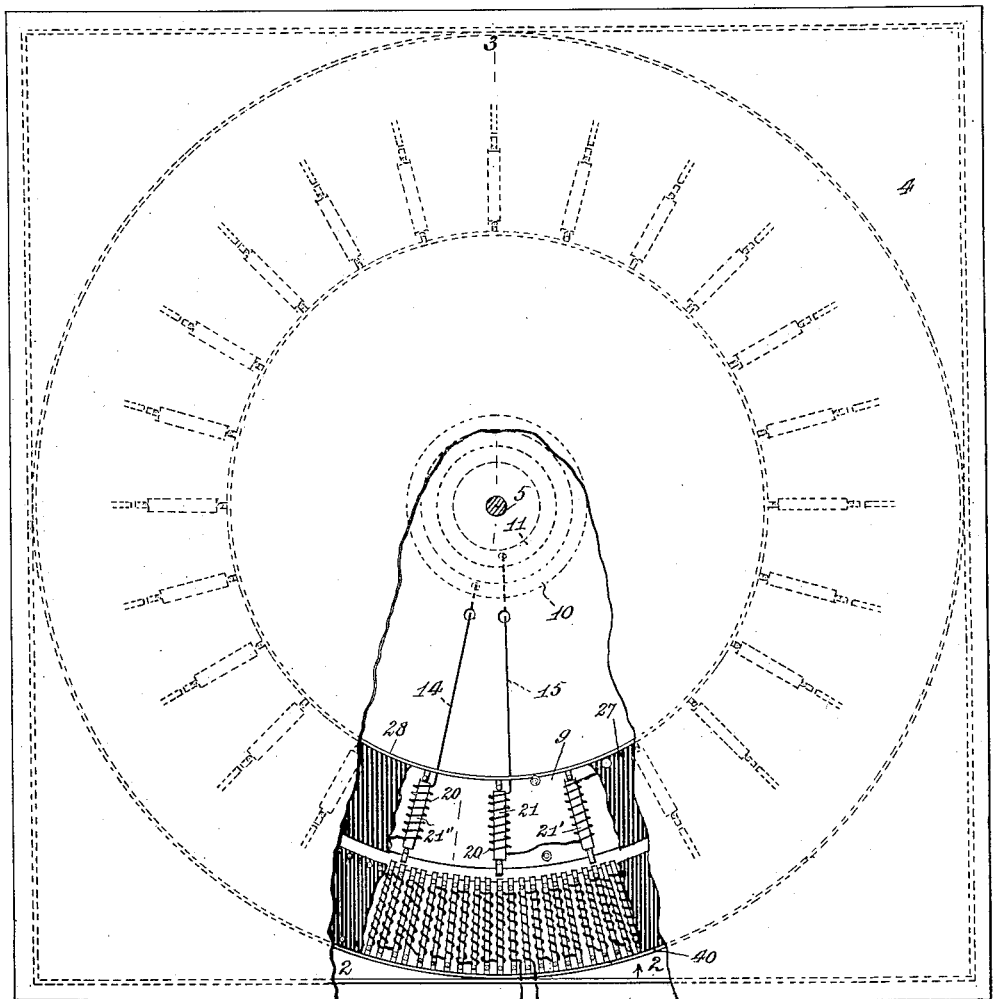
Figure 1 is a plan view of a synchronous motor disclosing a preferred and practical embodiment of the invention, certain parts being broken away for illustrating the construction.

Referring to the accompanying drawings by numerals, 1 indicates a casing which is provided with a base 2, an upstanding wall 3, and a cover plate 4. Arranged centrally of the casing 1 is a shaft 5 from which power may be taken for driving a turntable for a talking machine record or for driving any other device where a constant slow speed is desired. The shaft 5 is preferably mounted in suitable bearings 6 and 7 respectively in the base 2 and cover plate 4.

The motor will be described in respect to driving a talking machine record used in the moving picture industry, but it will be evident that the motor can be used for many other purposes. However, in the "talking movies" as it is expressed, the record must be in synchronism with the picture film, and by reason of speed of the picture film which is operated at a certain constant speed, the commercial machine disc now in use must be rotated 33⅓ times per minute, and the speed should be exact and the movement smooth and continuous without jerks and interruptions for each rotation. Heretofore, motors running at 1800 R. P. M., or some other speed, were used and geared down so that the desired speed for the record was secured, but by reason of this gearing down there often occurs a lag or lead in the movement of the record and also quite often the record is jerked more or less. It will be understood that these eccentric movements are very slight but that they affect the pitch of the sound produced from the records.

In the present instance a motor has been designed which will rotate at the exact speed desired without being geared down, and will maintain this speed regardless of any reasonable line voltage fluctuations or any irregularities in the load, the speed being altered or rather controlled by the frequency of the alternating current used. At the present time in the United States some of the alternating current is produced at different frequencies. In foreign countries this frequency also varies, and it will be understood that the parts of the motor disclosed in the present invention may be varied to meet this variation in frequency without departing from the principal of this invention.

Referring more specifically to the drawings it will be seen that the shaft 5 is keyed or otherwise secured to a disc 9 forming part of the armature, said disc being shown as made of an insulating material, but, if desired, it can be made of metal or some other material and the other parts insulated therefrom. A pair of slip rings 10 and 11 are rigidly secured to the disc 9 with screws or other suitable means, whereby the respective brushes 12 and 13 may make continuous contact therewith, said brushes being connected to a suitable source of direct current through wires 14 and 15. Contact posts 16 and 17 are rigidly secured to the slip rings 10 and 11 and wires 18 and 19 supply current to the various windings 20 of the armature.

As illustrated particularly in Figures 3 and 4 the armature not only includes disc 9 but a number of pole pieces 21, each pole piece having a winding 20 thereon. From Figure 3 it will be noted that each of the pole pieces is provided with a central flat section 22 merging into vertically expanded integral ends 23 and 24, each end having projecting portions 25 and 26. Projection 26 extends into a suitable depression or socket in disc 9, while projection 25 extends through a plate 27, said plate being made of insulating material preferably, although it might be made of some other kind of material and insulated from the pole pieces. In the specific motor disclosed in the accompanying drawings there are 24 pole pieces 21 in the armature and these pole pieces are connected together by a band 28 which is preferably of soft iron and which is embedded in the respective ends 24, as shown in Figure 3.

This band 28 acts as a means for the return flow of the magnetic flux. From Figure 4 it will be seen that the windings 20 are so placed on the pole pieces so that the pole piece 21'', shown in Figure 4, is south at end 31, while pole piece 21 is north at point 29, and pole pieces 21' is south at end 30. This arrangement is carried out throughout the entire armature so that alternately there would be a north and a south pole around the entire armature. As shown in the accompanying drawings there are 12 pole pieces having a north pole facing the field, and 12 south poles facing the field, the north and south poles being positioned alternately as illustrated.

As the current supplied to the windings 20 is direct current the polarity in the pole pieces in the armature remains the same continually, and the pole pieces remain continually energized. With regard to the field this is not true because in the field alternating current is used. However, it will be understood that if the parts are reversed and direct current is used in the field and alternating current in the armature windings, then the field poles will remain constantly energized. However, as shown in Figure 4, the armature is using direct current and the field a single phase alternating current of 60 cycles. The voltage may be 110 or any other voltage desired.

In order to secure 33⅓ revolutions per minute for a talking machine record, as above illustrated, there are 216 field poles 32. It will be understood that the armature pole pieces, as well as the field pole pieces, are evenly spaced and, in fact, the spacing must be fairly exact in order to secure the best results. For the further purpose of illustration the pole pieces 32ᵃ and 32ᵉ shown in Figure 4 are south at points 33 and 33'' respectively, and pole piece 32ᶜ is north at point 33'. At the same time points 34 and 34'' of the respective pole pieces 32 and 32ᵈ are north, while point 34' of pole piece 32ᵇ is south. This is carried out throughout all of the pole pieces, namely, pole piece 32ᵃ is south at point 33, the next one north, the next one south, and so on around the entire field. It will be understood, however, that this polarity is maintained only for a very limited time, the 1/120th part of a second, or for one half cycle.

In order to clarify the way the exact speed is secured it is desired to point out that 60 cycles per second equal 120 alternations per second, or 3600 cycles per minute equal 7200 alternations per minute. In order to secure a speed of 33⅓ R. P. M. in the case of a motor operating from a 60 cycle line, the 7200 alternations per minute should be divided by 33⅓, which will produce as an answer 216. Therefore, in order to secure an armature speed of 33⅓ R. P. M. the pole pieces in the field must be 216 in number. The pole pieces in the armature may vary and yet the speed remain the same. If a greater number of poles were used in the armature the motor would be stronger, whereas if a lesser number were used the motor would not be so strong.

It will be noted that the wires 36 and 37 lead to a suitable supply of alternating current of 60 cycles per second, and that they are connected to the various windings 38 on the various pole pieces 32. However, as illustrated in Figure 4, the windings on the pole pieces 32, 32ᶜ and 32ᵈ are in one direction, while the windings on the pole pieces 32ᵃ, 32ᵇ and 32ᵉ are in the opposite direction. Thus for a given direction of electromotive force each consecutive pole piece will be given an opposite magnetic polarity, or every other pole piece the same polarity, and consequently for a reversed direction of electromotive force each consecutive pole piece will have an opposite magnetic polarity, as in the first instance. When the polarity is as shown in Figure 4 pole piece 32ᵃ will repel pole piece 21'', while the polarity of the next pole piece 32 will attract the same, again pole piece 32ᶜ will repel pole piece 21 and it will be attracted by pole piece 32ᵇ, likewise pole piece 21' will be repelled by 32ᵉ and attracted by 32ᵈ, and so on around the complete armature, so that each one of the armature poles are effected as the ones cited above. All this happens within the period of ½ cycle, or one alternation, so that at the end of each alternation the armature has completed 1/216th of a revolution. The armature will not pass this point while this particular alternation exists, because of the contracting magnetic lines of force of the unlike poles of the armature and field, and also, because the neighboring field poles have the same polarity as the armature poles and the like polarity will have the effect of repelling any possible advance of the armature. But as soon as this polarity is changed by virtue of the reversed direction of electromotive force, the armature poles will again be repelled and caused to move to the next set of field poles, again causing the armature to move another 1/216th of a revolution, etc. The field pole pieces may be mounted in a number of ways, but as shown in the accompanying drawings are mounted similar to the pole pieces in the armature but are connected to a stationary or fixed ring 39, as shown in Figure 3. This ring is made of an insulating material but it can be made from other materials and the field pieces insulated therefrom.

The way the ends of the field pole pieces are made are identical to those described with respect to the armature. In addition a band or ring 40, preferably of soft iron, is used so as to make a return path for the magnetic flux of the field. It will be evident that, if desired, the armature could be made stationary and the field allowed to rotate, provided the proper slip ring connection is made for connecting the alternating current to the fields of the armature. However, ordinarily it is preferable to have the field held rigid and stationary while the armature rotates at the speed specified. As above stated, the addition or subtraction of pole pieces in the armature will greatly strengthen or weaken the motor. However, in regard to the field, by rearrangement of the field poles a different speed may be obtained. For instance, if a speed of 78 revolutions per minute was desired of a motor operating from a 60 cycle line, 92 field poles would be used and either 4 or 92 poles in the armature.

As shown in the accompanying drawings, there are 216 field poles and 24 armature poles, but if desired the armature poles could be changed to 8, 72, or 216, and the same result would be secured, namely, a rotation of 33⅓ R. P. M. However, where 8 poles are used the motor will be much weaker, whereas by the use of 216 poles in the armature the maximum strength would be obtained. To obtain the exact result specified there is presented an alternating current field consisting of 216 field poles connected to each other in such a manner that for a given direction of electromotive force their magnetic polarity alternates north, south, etc.

Let it be assumed that for a given instant the electromotive force rises from zero for the positive half of the cycle or positive alternation, and that the pole pieces are numbered from 1 to 216 in consecutive order, all the even numbered poles will be north and all the odd numbered poles will be south. If, at the above mentioned positive alternation, an armature pole magnetized south is placed opposite No. 1 pole of the alternating current field it will be repelled by pole No. 1 and attracted by pole No. 2 of the field. It will, therefore, be clear that at the end of one alternation the armature will have rotated 1/216th part of a revolution, and since, as shown above, there are 120 alternations per second, at the end of one second the armature will have rotated that part of a revolution as is occupied by 120 field poles, or 120/216th of a revolution per second. If we multiply 120/216 by 60 we have 7200/216ths, or 33⅓ revolutions per minute.

It is, of course, understood that the above facts are based on the assumption that the armature has been brought up to synchronous speed either manually or through its own action in the case of a three-phase motor. When a south pole on the armature is opposite a north pole in the field, or when the reverse is true, namely, when a north pole on the armature is opposite a south pole in the field, it is impossible for the armature pole to pass this point by virtue of any force of momentum because of the contracting action of the magnetic lines of all the unlike poles which at this time are opposite each other. In a sense it might well be said that the armature is temporarily locked in this position, or that the completion of one alternation means that the armature has completed 1/216th of a revolution.

As above outlined, the specific motor shown in the drawings has been designed to operate at a speed of 33⅓ revolutions per minute from a 60 cycle line. The same design is applicable to a motor to run 78 R. P. M. or any other rate of speed. In the case of a 78 R. P. M. motor to operate from a 60 cycle line, divide 7200 alternations by 78 and it will be seen that 92 field poles are needed. With 92 field poles it will be necessary to use either 4 or 92 armature poles, depending upon the amount of torque required. The same method of calculation may be used in designing synchronous motors, according to the present invention, where the required speed or supply frequency is different from that above specified.

Figure 2:
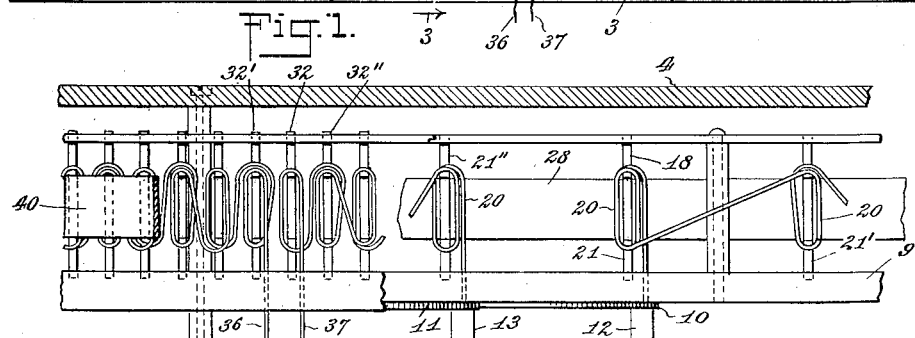
Figure 2 is an enlarged fragmentary sectional view through Figure 1, on the line 2—2.

The invention is also applicable to polyphase currents and, as shown in Figures 5 and 6, a structure is presented which is exactly on the same principle as that illustrated in Figures 1 to 4, except that the parts have been arranged to use a three-phase alternating current. In order to secure the desired result there are provided three sets of poles in the field and a similar number of sets of poles in the armature. As illustrated in Figure 6, the armature is provided with poles 41, 42 and 43, while the field is provided with poles 44, 45 and 46. It will be understood that poles 41 to 43 inclusive are in exact alignment as illustrated in Figure 5. With regard to poles 44 to 46 of the field, however, they are slightly offset, as illustrated in Figure 5. In order to describe the three phase motor more clearly, let poles 46 in Figure 6 represent phase "A", poles 45 represent phase "C", and poles 44 represent phase "B".

It should be noted that the phase windings are arranged in the order of rotation (rotating to the left looking at Figure 5) in the sequence "A", "C", "B". Phase "C" windings are in the opposite direction to those of phases "A" and "B", as indicated in Figures 5 and 6, since phase "C" is below the zero line of the sine curve while phases "A" and "B" are above the zero line and therefore has a direction of electromotive force opposite to that to phases "A" and "B". Since phase "A" leads pole 46 will attain its maximum magnetic polarity first and as it falls phase "C" rises and energizes pole 45 so that pole 45 has its maximum magnetic polarity next. The same thing proves true with phase "B", as phase "C" falls phase "B" rises and energizes pole 44 to its maximum magnetic polarity. It will be seen from the above that there is a constantly rotating magnetic field.

It will, of course, be understood that the pulsations rise and fall and there will be a certain amount of overlap and certain times when the pole pieces will be dead or de-energized, that is, in the proper sequence one at a time. However, the action might be said to be quite similar to three single phase motors on the same shaft with one phase leading the other. Preferably, as in a structure shown in Figures 5 and 6, the three sets of field poles are placed one on top of the other, the second phase poles occupy a position in the circumference such that it is one-third the distance between the two concentric first phase poles, the third phase poles have a position such that they occupy a space two-thirds the distance between the two first phase poles.

In the case of the armature the magnetic polarity is the same for the three poles, namely, 41, 42 and 43 say all north, while the neighboring set of poles are all south, the next set all north, etc.

The construction of the three phase synchronous motor is based on the same theory as a single phase motor and has the same number of field poles in each phase, it also has the same number of armature poles in each layer. The advantage of the three-phase motor is that it is self starting, whereas a single phase motor must usually be started either manually or in some other way. To obtain the number of armature poles divide the number of field poles by any even number that produces an odd number.

The direct current for the armature is obtained from any suitable source, while the alternating current for the field is also obtained from any suitable alternating current source. From Figures 5 and 6 it will be noted that the windings on poles 44 and 46 are in the same direction, while the windings on pole 45 is in the reversed direction whereby the current in this phase is reversed in order to secure the desired result with successive south poles and then north poles. Referring to Figure 5 it will be seen that one end of each group is to be connected to the line wire and the return wires are to be connected to the common junction 47.

What I claim is—

1. In a synchronous motor, a casing comprising a horizontal bottom portion, a top portion parallel with the bottom portion and spaced therefrom, a vertically extending shaft journalled in the bottom and top portions, an insulating disk secured to the shaft to revolve therewith, a plurality of armature pole pieces disposed radially with respect to the axis of the shaft, each of said pole pieces having a central flat section merging into inner and outer vertically expended ends, the lower portions of said inner and outer ends being secured to said disk, an annular insulating plate secured to and connecting the tops of said extensions, a magnetically permeable band connecting the inner ends of said pole pieces, an annular insulating ring surrounding said disk and being in the same plane therewith, means for securing said ring rigidly to said casing, a plurality of radially disposed field pole pieces, each field pole piece having a flat central portion and vertically expanded integral ends, the lower ends being secured to said insulating ring, a ring for securing the upper ends of the expanded portions of the field pole pieces and an outer magnetically permeable band secured to and connecting the outer ends of said field pole pieces.

2. In a synchronous motor, a casing comprising a bottom portion and a top portion, a vertically extending shaft journalled in the bottom and top portions, an insulating disk secured to the shaft to revolve therewith, a plurality of armature pole pieces disposed radially with respect to the axis of the shaft, means for securing the inner and outer ends of said pole pieces to said disk, an annular insulating plate secured to and connected with the inner and outer ends of said pole pieces on the side opposite from the disk, and a magnetically permeable band connecting the inner ends of said pole pieces.

3. In a synchronous motor, a casing comprising a bottom portion and a top portion, a vertically extending shaft journalled in the bottom and top portions, an insulating disk secured to the shaft to revolve therewith, a plurality of armature pole pieces disposed radially with respect to the axis of the shaft, means for securing the inner and outer ends of said pole pieces to said disk, an annular insulating plate secured to and connected with the inner and outer ends of said pole pieces on the side opposite from the disk, a magnetically permeable band connecting the inner ends of said pole pieces, an annular insulating ring surrounding said disk and being in the same plane therewith, means for securing said ring rigidly to the casing, a plurality of radially disposed field pole pieces, the inner and outer ends of said pole pieces being secured to said insulating ring, a ring connecting the field pole pieces on the opposite side from the insulating ring and an outer magnetically permeable band secured to and connecting the inner ends of said field pole pieces.

4. In a synchronous motor, a rotatable insulating plate, a plurality of armature pole pieces disposed radially with respect to the axis of the plate, each of said pole pieces having a central flat section merging into inner and outer vertically expanded ends, the lower portions of said inner and outer ends being secured to said disk, an annular insulating plate secured to and connecting the tops of said extensions and a magnetically permeable band connecting the inner ends of said pole pieces.

5. In a synchronous motor, an insulating disk having sockets, a plurality of radially disposed armature pole pieces, each of said pole pieces having a central flat section merging into inner and outer vertically expanded ends, the lower portions of said ends having projections arranged to enter said sockets and an annular ring having recesses arranged to receive projections on the upper portions of said expanded ends for aiding in holding said pole pieces in spaced relation.

6. In a synchronous motor, an insulating disk having sockets, a plurality of radially disposed armature pole pieces, each of said pole pieces having a central flat section merging into inner and outer vertically expanded ends, the lower portions of said ends having projections arranged to enter said sockets, an annular ring having recesses arranged to receive projections on the upper portions of said expanded ends for aiding in holding said pole pieces in spaced relation and a magnetically permeable ring embedded in and connecting the inner ends of said pole pieces.

7. In a synchronous motor, an insulating support having sockets, a plurality of spaced-apart pole pieces, each of said pole pieces having a central flat section merging into vertically expanded ends, said vertically expanded ends having projections arranged to enter said sockets and a ring disposed on the opposite side of the pole pieces from the support having openings arranged to receive the projections, for aiding in holding the pole pieces in spaced relation.

8. A motor for producing 33⅓ revolutions per minute with a 60-cycle current and a direct current supplied thereto, said motor including a field ring having 216 exactly spaced pole piece receiving openings adjacent each edge, the respective openings being radially opposite each other, an armature including a rotatable member having an area at the outer part formed with two concentric rows of openings exactly spaced apart with the respective openings being positioned radially to each other and in number a multiple of 216, a pole piece carried by said field ring for each pair of openings in the field rings which are radially positioned with respect to each other, said field pole pieces having extensions fitting into said last mentioned openings, an armature pole piece carried by said area for each pair of openings in the area which are radially positioned with respect to each other, said armature pole pieces having extensions fitting into the respective openings in said area whereby the armature is caused to rotate at exactly uniform angular velocity in addition to the consequent 33⅓ revolutions per minute, a winding on each of said armature pole pieces, means for supplying direct current to the windings on the armature pole pieces, windings for each of said field pole pieces, each alternate armature field pole piece being wound in an opposite direction, means for connecting the windings of said field pole pieces in series, and means for connecting a 60-cycle alternating current to the windings of said field pole pieces whereby the field pole pieces will have their polarity reversed upon each alternation of said current, while the polarity of said armature pole pieces remains constant, thus permitting the flux of the respective field pole pieces and the armature pole pieces to cause the armature to move at an exact speed with a constant torque.

9. A motor for producing 33⅓ revolutions per minute with a 60-cycle current and a direct current supplied thereto, said motor including a stationary casing having top and bottom plates, a field ring having 216 exactly spaced field pole piece receiving openings adjacent each edge, the respective openings being radially opposite each other, a field pole piece carried by said field ring for each pair of openings in the field ring which are radially positioned with respect to each other, said field pole pieces having extensions fitting into said last mentioned openings, said field pole pieces each having a second pair of projections, a bracing ring fitting over said second projections and interlocking therewith, anchoring means carried by said top and bottom plates, said anchoring means extending through both of said rings for holding the rings in a fixed position, an armature including a rotatable member having an area on the outer part formed with two concentric rows of openings exactly spaced apart with the respective openings being positioned radially to each other and in number a multiple of 216, an armature pole piece carried by said area for each pair of openings in the area which are radially positioned with respect to each other, said armature pole pieces having top and bottom extensions, said bottom extensions fitting into the respective openings in said area, a bracing ring having openings for accommodating the other extensions of said armature pole pieces, and means extending through said bracing ring and carried by said rotatable member whereby the bracing ring and armature pole pieces are anchored firmly to the rotatable member, whereby the armature is caused to rotate at exactly uniform angular velocity in addition to the consequent 33⅓ revolutions per minute, a winding on each of said armature pole pieces, said armature windings being alternately in opposite directions, means for supplying direct current to said armature windings, a winding for each of said field pole pieces, each alternate field pole piece being wound in the opposite direction, means for connecting a 60-cycle alternating current to the windings of said field pole pieces whereby said field pole pieces will have their polarity reversed upon each alternation of said 60-cycle current, while the polarity of the pole pieces of the armature remains constant, thus permitting the flux of the respective field pole pieces and the armature pole pieces to cause the armature to move at exact speed with a constant torque.

10. A motor for producing a predetermined number of revolutions per minute from an alternating current of a given frequency and a direct current, said motor including a field having an even number of field pole pieces, an armature having an even number of pole pieces the number of pole pieces of the armature being a multiple of the pole pieces of the field, a winding on each of said armature pole pieces, said windings being alternately in opposite directions, means for supplying direct current to the windings on said armature pole pieces, a winding for each of said field pole pieces, each alternate field pole piece being wound in the opposite direction, means for connecting the windings of said field pole pieces in series, and means for connecting an alternating current to the windings of the said field pole pieces whereby the field pole pieces will have their polarity reversed upon each alteration while the polarity of the armature pole pieces will remain constant, thus permitting the flux of the respective field pole pieces and the armature pole pieces to cause the armature to move at exact speed with a constant torque and with an exactly uniform angular velocity.

ROBERT HELMER.